Oct. 6, 1931.　　P. G. H. HALLONGREN　　1,825,953
DEVICE FOR PERMITTING THE CONTINUOUS FEEDING
OF THE FILM IN PROJECTING APPARATUS
Filed Feb. 12, 1927　　2 Sheets-Sheet 1
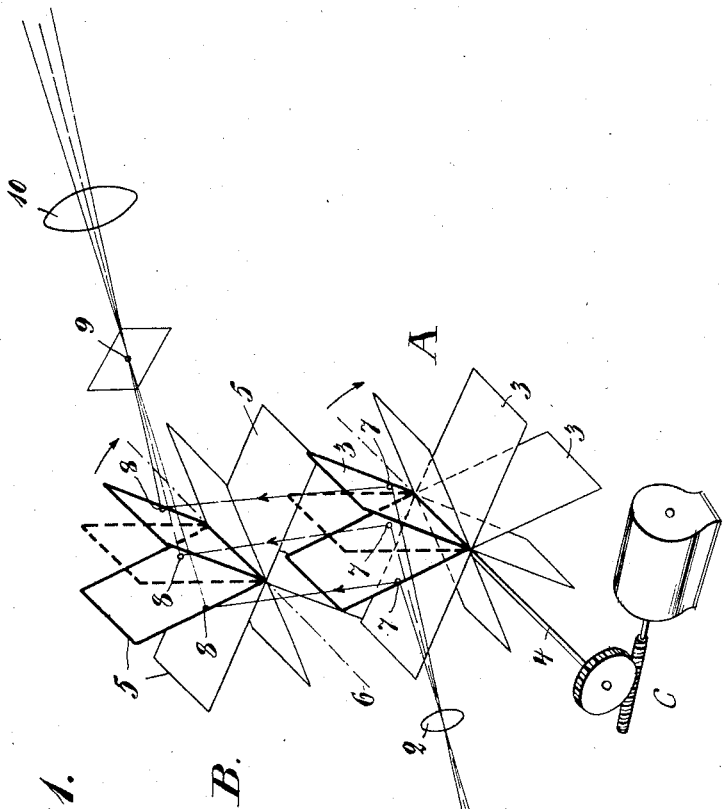
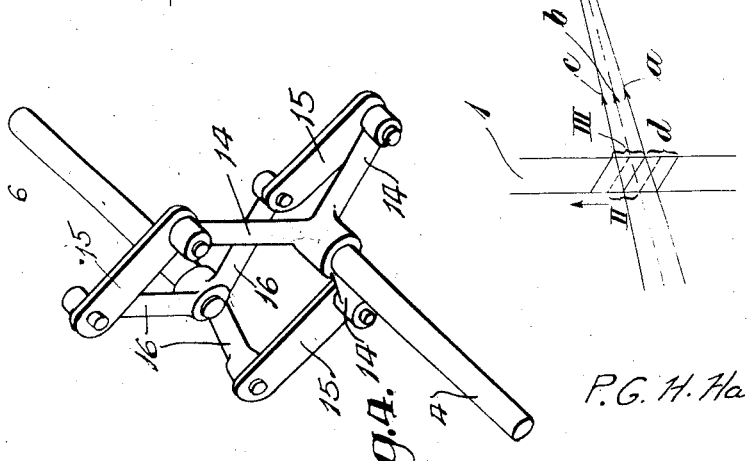
P. G. H. Hallongren
INVENTOR
By: Marks & Clark
Attys.

Oct. 6, 1931.   P. G. H. HALLONGREN   1,825,953
DEVICE FOR PERMITTING THE CONTINUOUS FEEDING
OF THE FILM IN PROJECTING APPARATUS
Filed Feb. 12, 1927   2 Sheets-Sheet 2
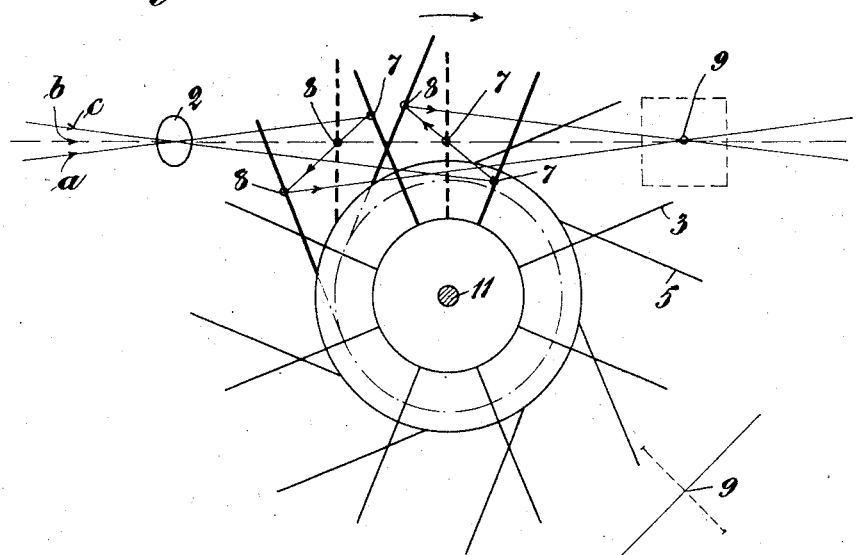
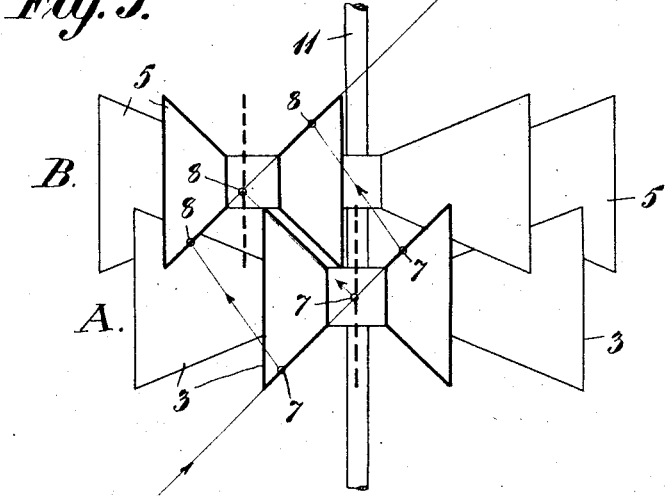
P. G. H. Hallongren
INVENTOR
By: Marks & Clerk
Attys.

Patented Oct. 6, 1931

1,825,953

UNITED STATES PATENT OFFICE

PER GEORG HALVAR HALLONGREN, OF STOCKHOLM, SWEDEN

DEVICE FOR PERMITTING THE CONTINUOUS FEEDING OF THE FILM IN PROJECTING APPARATUS

Application filed February 12, 1927, Serial No. 167,857, and in Sweden February 16, 1926.

This invention relates to devices in projecting apparatus, the object of which is to permit the continuous feeding of the film by the displacing (or so called wandering) of the different pictures, resulting from the continuous feeding, being equalized optically through the action of rotating reflecting members, so that the different images become stationary for a moment on the screen. The devices hitherto used for the said purpose, however, have been more or less complicated and, generally, have not functionated wholly satisfactorily, which is proved best by the fact that they have not been used in such an extent, as one would have supposed.

The object of the invention is to improve the said devices and is characterized chiefly by the reflecting members being divided into at least two groups, which successively reflect the picture rays and are positively caused to turn synchronously, during which operation the active surfaces or the surfaces struck by the picture rays turn in the same direction and the said rays pass the reflecting surfaces at the same side of the axis or axes of rotation through which the said reflecting surface or surfaces extend or with which the surface or surfaces are substantially parallel, the said axis or axes having an oblique position with relation to the plane, on which the incoming rays travel (the plane of the wandering picture).

If two axes of rotation are provided the reflecting surfaces may be located either radially round the axes or tangentially to cylindrical surfaces enclosing the axes of rotation and concentric with the same. In practice the two groups of reflecting members preferably are located round an axis common to the same and the reflecting surfaces of the one group located radially, while the reflecting surfaces of the second group are located tangentially to a cylindrical surface enclosing the said axis and concentric with the same. Also in this case, however, all reflecting surfaces may be located tangentially to cylindrical surfaces enclosing the axis and concentric with the same.

Two forms of execution of the invention are illustrated in the accompanying drawings. Fig. 1 shows in a perspective view the device in question; each of the two groups of reflecting members having its axis of rotation. Figs. 2 and 3 show in a side view and in a plan view a form of execution, according to which the axis of rotation is common to the two groups of reflecting surfaces. Fig. 4 is a perspective view of an arrangement for combining the two groups of reflecting members to cause them to turn synchronously.

1, Fig. 1, is a film, moved continuously in the direction indicated by the arrow, while illuminated by a suitable source of light (not shown on the drawings), so that picture rays $a$, $b$ and $c$ are directed toward an objective 2. In the path of the picture rays passing from the said objective 2 a group of mirrors A is located, in which all mirrors 3 are plane and located radially to an axis of rotation 4 common to the same. As the picture rays strike the mirrors 3, they are reflected to a second group of mirrors comprising plane mirrors 5, located radially to an axis of rotation 6 common to the same. The picture rays are then reflected by the mirrors 5 towards the screen. An electric motor C may be used as a rotating means, a worm gear or the like transmitting movement to the axis 4.

The device operates in the following manner. Assuming, the groups of mirrors A and B rotate at the same rate in the directions indicated by the arrows and the film 1 is moved continuously upwards. The picture ray $a$ passing from the centre of a picture $d$ of the film then strikes one of the mirrors 3 at the point 7, from which it is reflected to the group of mirrors B, at which the said ray strikes one of the mirrors 5 at the point 8, from which it is reflected toward the screen. In the drawings those mirrors, which are struck by the picture ray, are shown by thicker lines than the other mirrors. Owing to the fact that the picture $d$ moves continuously and gradually passes the positions designated by II and III, the picture rays evidently, also will travel, so that the picture ray $a$ is successively turned upwards to the rays designated by $b$ and $c$. While the picture ray is turned from the $a$-line to the $b$-line and $c$-line, the groups of mirrors A and B are turned through a certain angle, which according to the drawings, is equal to the angle between two neighbouring mirrors. The point 7 of reflection thus travels from the front edge of the mirror to rear edge of the same as shown in the drawings. A medium position on the mirror struck by the picture ray is shown by dotted lines. The rays reflected by the group of mirrors A strike one of the mirrors 5 of the group B and the point of reflection 8 is caused to travel in a manner analogous to that of the point of reflection 7. The rays reflected by the group of mirrors B, evidently, converge in a degree substantially corresponding to the divergence of the rays, which strike the groups of mirrors A, which results in the picture rays meeting in a point 9 at a certain distance from the group of mirrors B. In the said point, which is located in front of the screen, a stationary image, evidently, is obtained, provided that the distance between the film and the objective and the focal distance of the objective are so adapted, that a sharp image is obtained at the said point. By means of a second objective 10 the said image may be projected on the screen. In a plane intersecting the point 9 a stationary aperture is provided, the size of which is equal to the size of the image effected at the point 9. In this manner those pictures of the film may be excluded, which one desires not to be projected on the screen.

By means of the described device an effective equalizing of the wandering of the images is obtained without the use of any complicated constructions or movements of the reflecting members. The essential feature of the device consists in the two groups of mirrors A and B rotating synchronously and in the axes of rotation 4 and 6 of the said groups forming an acute angle with the plane in which the incoming rays travel. The synchronism of the rotary motion of the groups of mirrors may, evidently, easily be effected and secured in a reliable manner. Fig. 4 shows an example of an arrangement for effecting synchronous rotary motion of the groups of mirrors. The axis of rotation 4 of one group of mirrors is provided with three arms 14 which by means of links 15 are combined with arms 16 arranged on the axis of rotation 6 of the other group of mirrors, the mirrors being removed. In arranging the mirrors in such manner, that different portions of the incoming image are projected on two mirrors simultaneously partly an advantageous intensifying of the image partly a more uniform transition from an image to the subsequent one may be obtained.

The rate of the rotary motion of the groups of mirrors must, evidently, have a certain relation to the velocity at which the film is fed. Further, the number of mirrors of the groups must be equal and the width of the mirrors so great, that no picture rays can pass through the groups of mirrors unreflected.

The form of execution shown in Figs. 2 and 3 differs from that described above substantially by the two groups of mirrors A and B having the same axis of rotation 11. In order to render possible this arrangement, the mirrors 5 of the group B are located tangentially to a cylinder concentric with the common axis of rotation. The mirrors 3 of the group A may be located either radially to the said shaft or tangentially to a cylindrical surface enclosing the shaft and concentric with the same. The picture rays $a$, $b$ and $c$ are reflected in substantially the same way as described above, so that a stationary image is produced at the point 9. The points of reflection on the mirror 3 are designated by 7 as before, while the points of reflection on the mirror 5 are designated by 8. The mode of operating is substantially the same as in the form of execution illustrated in Fig. 1, and for that reason a description of the same may be superfluous. Preferably, the mirrors have the shape shown in Fig. 3, in order that all picture rays passing from the objective 2 may be reflected and that the reflected rays may not be excluded by the mirrors located behind.

The form of execution shown in Figs. 2 and 3, is, probably, the most practical, because the synchronism of the groups of mirrors is wholly secured. The reason why the form shown in Fig. 1 has been more closely described is that it discloses in a more clear manner the principle of the invention.

The mirrors, evidently, must not be perfectly parallel to the rotary axis. The two forms of execution described above are shown very diagrammatically and only serve to illustrate the principle of the invention. The limits of the invention are not exceeded by varying the details, dimensions and shape.

I claim:

1. In a device for projecting from a continuously fed film through a projecting apparatus having means for projecting a light through said film, the combination of a group of plane reflecting members arranged on a rotating axis, a second group of plane reflecting members also arranged on a rotating axis and means for rotating the said groups synchronously with each other in the same direction for reflecting the picture rays successively, the reflecting surfaces of each group facing one and the same peripheral direction, the reflecting surfaces of one of the groups facing the direction of rotation and the reflecting surfaces of the other group facing the opposite direction.

2. In a device for projecting from a continuously fed film through a projecting apparatus having means for projecting a light through said film as claimed in claim 1, and in combination therewith of means for forming a real image of a picture on said film in front of said screen and means for framing said image through an aperture corresponding to said image whereby such parts of said film as are not desired are excluded substantially as described and for the purposes specified.

In testimony whereof I have hereunto affixed my signature.

PER GEORG HALVAR HALLONGREN.